Aug. 30, 1932.    W. H. WYLAND    1,874,730
MASTER CORE FOR FISHING BOBS
Filed Oct. 17, 1930
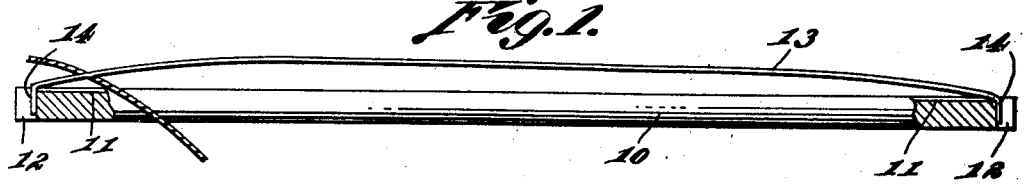
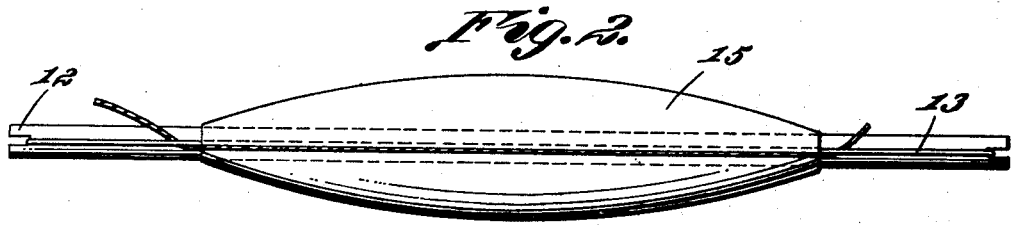
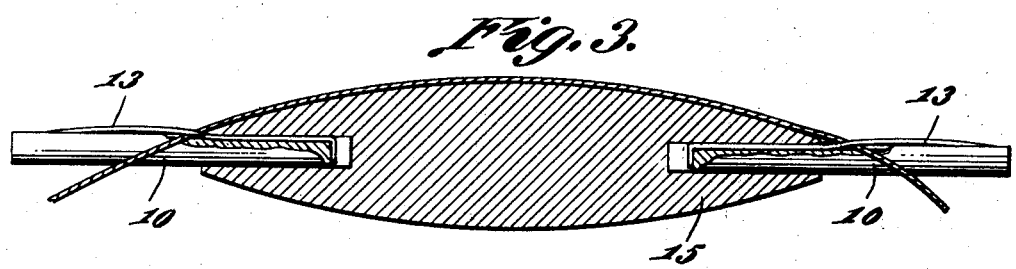
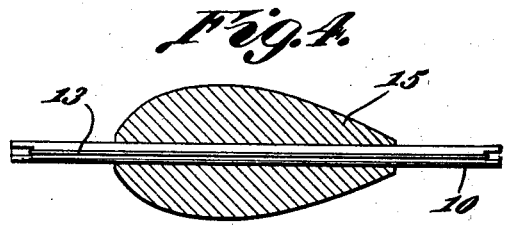
William H. Wyland,
INVENTOR
BY Victor J. Evans
ATTORNEY
WITNESS:

Patented Aug. 30, 1932

1,874,730

UNITED STATES PATENT OFFICE

WILLIAM H. WYLAND, OF SIDNEY, OHIO

MASTER CORE FOR FISHING BOBS

Application filed October 17, 1930. Serial No. 489,431.

This invention relates to certain new and useful improvements in buoys, floats, or bobs employed for the purpose of marking boat anchorages and for fresh water fishing.

One of the principal objects of the invention consists of a stem structure for the float having detachable connection therewith.

An additional object of the invention contemplates the provision and arrangement of a locking element for the stem to prevent accidental displacement thereof from the float.

More specifically stated the locking element is designed for yielding detachable engagement with the remote end of the stem to facilitate the interposing of a fishing cord or line therebetween.

With the above and other objects in view, the invention further consists of the following novel features and details of construction, to be hereinafter more fully described, illustrated in the accompanying drawing and pointed out in the appended claim.

In the drawing:—

Figure 1 is a side elevation of the stem structure and locking element therefor with the stem partly in section to illustrate the terminal connections of the locking element therewith.

Figure 2 is a top plan view of the stem and locking element with a float member disposed in active position thereon.

Figure 3 is a longitudinal sectional view taken through a float member and illustrative of the employment of a sectional form of stem structure.

Figure 4 is a view similar to Figure 2 illustrating the employment of a float member of different shape.

Referring to the drawing in detail wherein like characters of reference denote corresponding parts, the reference character 10 indicates generally a form of staff or stem preferably of cross section circular shape and grooved, as at 11, longitudinally thereof throughout the major portion of its length. Said stem is also provided with cut-out portions 12 in the ends thereof disposed for intersecting relation and communication with the groove 11 at right angles thereto in the manner suggested in Figure 1 of the drawing.

A locking element for the stem structure, generally designated as at 13 and composed of spring wire, has the ends thereof offset, as at 14, for disposition within the slots 12 and to bulge or otherwise dispose the major portion thereof spaced from the groove 11. A float member 15 having a longitudinal bore, is then slid for telescopic association with the stem and locking element in the manner suggested in Figure 2 of the drawing whereby the latter will be forced within the groove 11. Those portions of the locking element 13 projecting outwardly and beyond the ends of the float are removed temporarily from the groove 11 and slots or recesses 12 to facilitate passage of a fishing line or cord therebetween in the manner suggested in Figure 2.

As evidenced from the illustration of my invention in Figure 3 of the drawing, the stem may be of sectional formation, that is, employing a solid form of float having passageways or pockets within the ends thereof to accommodate short stems. Said stems are, however, constructed along the lines pursued in the formation of the stem 10 as well as the construction and arrangement of the locking elements therefor whereby the float may be retained against independent sliding motion upon the line.

In Figure 4 of the drawing I have illustrated a modified form of float employing the preferred form of stem structure.

In each instance of the employment of the different forms of my invention, the result is the same, that is, the float in and of itself will be yieldingly maintained against accidental displacement from the stem structure and the fishing line or cord may be readily detached from the stem structure without requiring removal and replacement of the float member per se.

The tension of the yieldable locking elements will be such, however, as to retard any tendency of the completed float structure from independent sliding motion upon the fishing line, in view of the fact that all of the snubbing or jerking motion will be transmitted through the cord alone.

The invention is susceptible of various changes in its form, proportions and minor details of construction and the right is herein reserved to make such changes as properly fall within the scope of the appended claim.

Having described the invention, what is claimed is:

A bob comprising a float body having an opening, a stem member inserted in the opening, said stem member being recessed diametrically at its ends, a spring wire carried by the stem member and frictionally engaging the wall of the opening in the body and having angularly disposed ends engaging the surfaces of the diametrically recessed portions of the stem.

In testimony whereof I affix my signature.

WILLIAM H. WYLAND.